T. LINSTER.
DRYING REEL.
APPLICATION FILED MAR. 6, 1915.
1,193,032.
Patented Aug. 1, 1916.
3 SHEETS—SHEET 1.
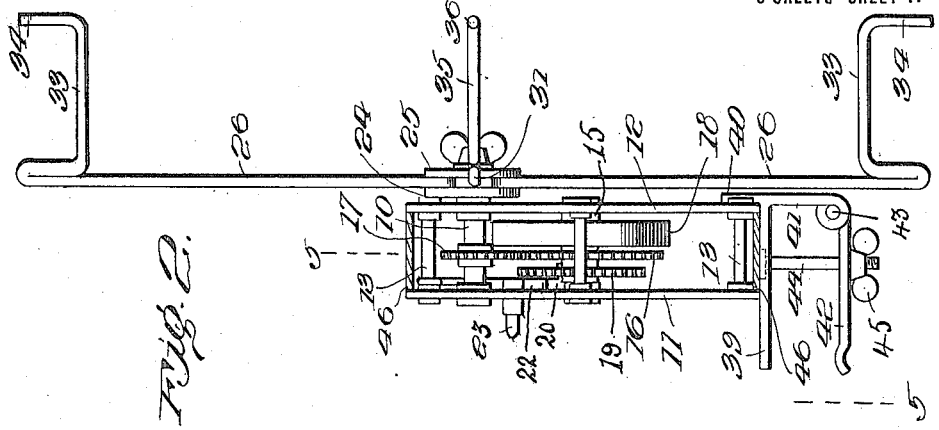
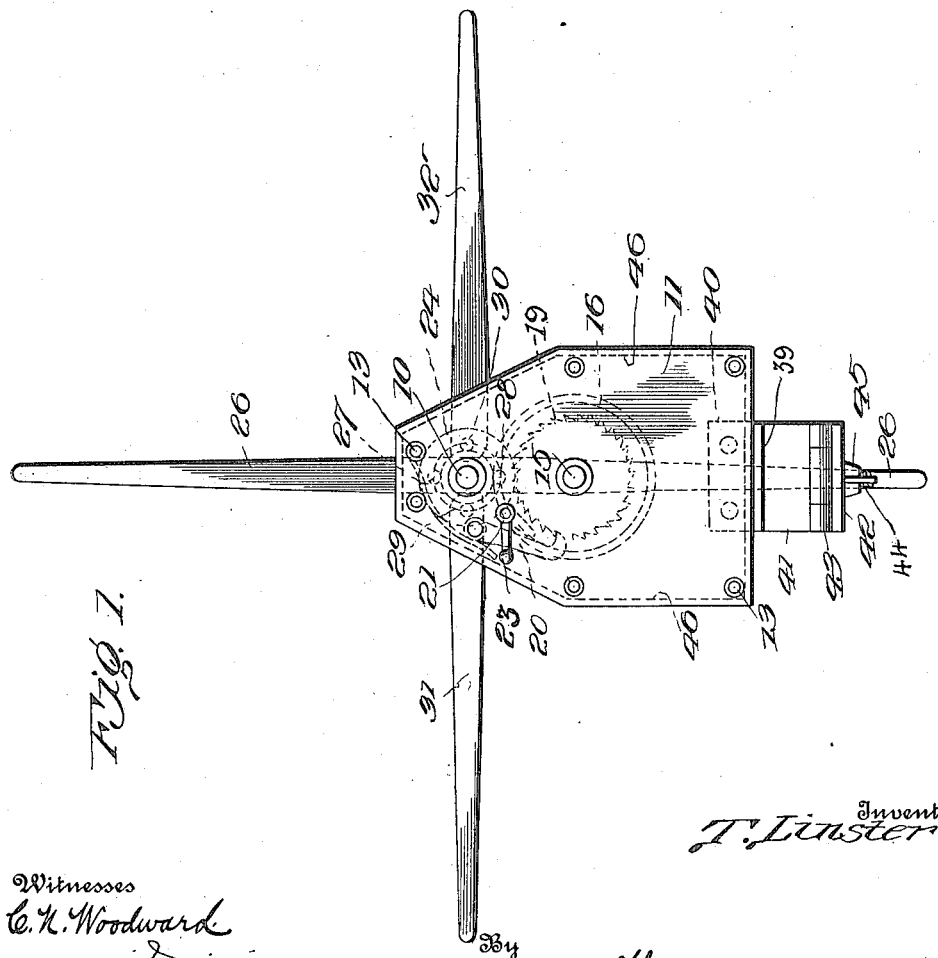

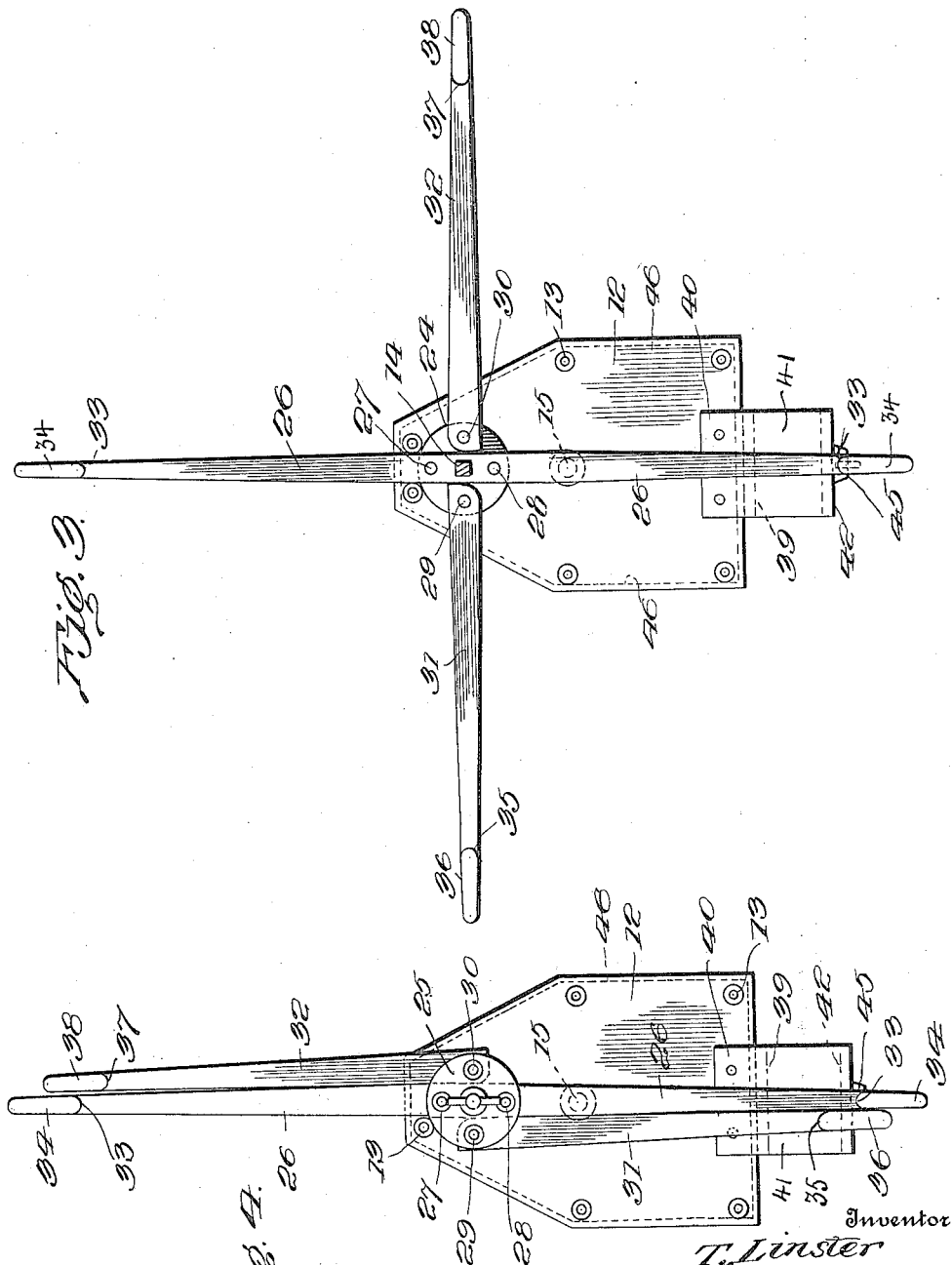

T. LINSTER.
DRYING REEL.
APPLICATION FILED MAR. 6, 1915.
1,193,032.
Patented Aug. 1, 1916.
3 SHEETS—SHEET 3.
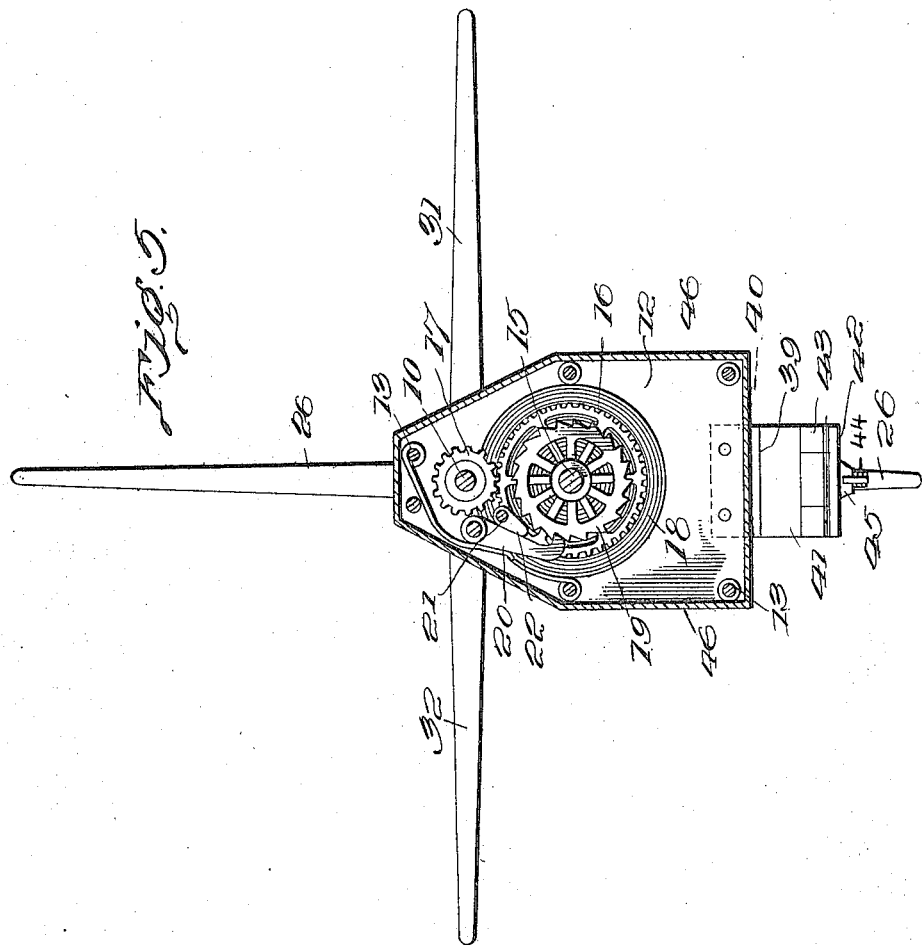
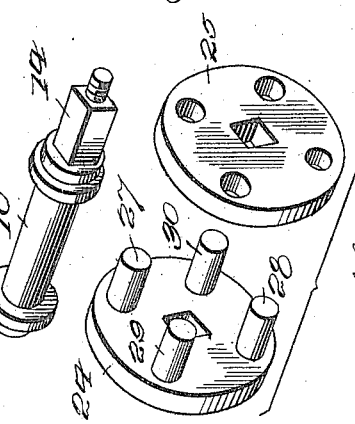
Witnesses
C. N. Woodward
Jno Imirie
Inventor
T. Linster
By
Attorneys

UNITED STATES PATENT OFFICE.

THEODORE LINSTER, OF NEILLSVILLE, WISCONSIN.

DRYING-REEL.

1,193,032.       Specification of Letters Patent.       Patented Aug. 1, 1916.

Application filed March 6, 1915. Serial No. 12,651.

*To all whom it may concern:*

Be it known that I, THEODORE LINSTER, a citizen of the United States, residing at Neillsville, in the county of Clark and State of Wisconsin, have invented certain new and useful Improvements in Drying-Reels, of which the following is a specification.

This invention relates to improvements in winding or reeling devices, more particularly adapted for winding fish lines and the like to enable them to be dried after being used, and has for one of its objects to simplify and improve the construction and increase the efficiency and utility of devices of this character.

Another object of the invention is to provide a simply constructed device which will automatically wind the fish line thereon and including a spring adapted to be wound up by the withdrawal or unwinding of the line and set for the next operation.

Another object of the invention is to provide a simply constructed device which may be partly folded for transportation and storage when not in use.

With these and other objects in view the invention consists in certain novel features as hereinafter shown and described and then more particularly pointed out in the claims; and in the drawings illustrative of the preferred embodiment of the invention, Figure 1 is a rear elevation of the improved device. Fig. 2 is an edge view with the casing in section. Fig. 3 is a front elevation with the reeling arms distended and the outer clamp plate detached. Fig. 4 is a view similar to Fig. 3 with the reeling arms folded. Fig. 5 is a sectional elevation on the line 5—5 of Fig. 2. Fig. 6 is an enlarged detached perspective view of the main drive shaft. Fig. 7 represents perspective views of the supporting plates for the reel arms.

Corresponding and like parts are referred to in the following description and indicated in all the views of the accompanying drawings by the same reference characters.

The improved device comprises a main driving shaft having a plurality of reel arms connected for rotation therewith, a spring operating to rotate the main shaft and the reel arms carried thereby in one direction, and a catch device operating to hold the spring in wound condition. The main shaft is represented conventionally at 10 and supported between side plates 11—12, the latter held in spaced relation by spacing posts 13. The main shaft is provided with a square portion 14 at one end, the square portion projecting beyond the plate 11 in position to receive the reel arms as hereinafter explained.

A countershaft 15 is mounted for rotation through the plate members 11—12 and carrying a gear wheel 16 engaging a pinion 17 on the shaft 10. A spring 18 is connected at one end to the countershaft 15 and at the other end to one of the posts 13. A ratchet wheel 19 is likewise connected to the shaft 15 and held from rotation in one direction by a spring controlled pawl 20. Mounted for rotation in the plate 11 is a stub shaft 21 carrying an arm 22 on its inner end to engage the pawl 20 and a finger arm 23 at its outer end externally of the plate 11 to enable the shaft 21 to be rotated to cause the arm 22 to throw the pawl 20 out of engagement with the ratchet wheel 19 when required.

Mounted upon the square portion 14 of the shaft 10 are bearing plates 24—25 spaced apart as shown in Fig. 2. An arm member 26 is provided with a square aperture to engage over the square portion of the shaft 10 and extending between the plates 24—25. The member 26 is likewise secured by transverse pins or bolts 27—28 to the plates 24—25. Extending through the plates 24—25 at opposite sides of the member 26 are pins or bolts 29—30, the pins 27—28—29 and 30 being spaced equal distances apart and at equal distances from the square portion of the shaft. Mounted to swing upon the pin or bolt 29 is an arm 31 while a similar arm 32 is mounted to swing upon the pin or bolt 30. The portions of the arms 26 which extend beyond the plates 24—25 correspond to the portions of the arms 31—32 which extend beyond the plates, as illustrated in Figs. 1, 3, 4 and 5 and constitute the reel arms of the improved device. By pivoting the arms 31—32 between the plates 24—25 the latter may be folded into parallel relation to the double arm 26, as shown in Fig. 4, when the device is not in use or when being stored and thus occupy less space.

At its terminus the double arm 26 is provided with laterally directed line supports 33 outturned at their free ends as shown at 34. The arm 31 is likewise extended laterally as shown at 35, and its terminal outturned as shown at 36. The arm 32 is likewise extended laterally, as shown at 37, with the free end of the outturned portion extended outwardly as shown at 38. The laterally directed portions 33, 35 and 37 are spaced inwardly from the outer terminals of the arms 31—32, as indicated in Fig. 2, and coöperate to form the supports for the line, as hereinafter explained.

The inner ends of the members 31—32 are each formed with a square shoulder, as shown in Figs. 1, 3 and 4, to bear against the member 26 and thus limit the movement in one direction and hold the portions 33—35—37 spaced equal distances apart when the device is in open position, the free end of the member 42 is curved upwardly as shown in Fig. 2 to increase the "grip" when applied to a supporting structure.

A suitable clamp is provided for supporting the improved device upon a table, shelf, or other support, and consists in a rigid plate 39 connected at 40 to one of the side members, for instance, the member 12, and provided with an extension 41 to which a clamp member 42 is hingedly united at 43. The two members 39—43 are connected by a clamp bolt 44 having a clamp nut 45. In this manner the improved device may be readily clamped to a table, shelf, or other support, as will be obvious.

Spaced between the plates 11—12 and inclosing the posts 13 is mounted a shell or casing 46 which is continuous and without openings, and thus effectually protects the mechanism which is disposed between the sides 11—12 from dust and the elements.

The reel arms are rotated to wind up the spring which is retained in its wound position by the pawl 20. The outer terminal of the line to be reeled is then secured to one of the lateral projections of the reel arms and the line guided by the fingers of one hand while the arm 23 is actuated to release the pawl to permit the spring to rotate the reel arms and wind up the line thereon, the operator guiding the line to distribute it uniformly upon the lateral projections of the reel arms. The line is thus disposed in open condition through which the air can freely circulate and thoroughly and uniformly dry it. After the line has become dried, the operator connects the outer end to the line reel, which is to be attached to the fish pole, and winds up the line thereon in the usual manner, and thus unwinds the line from the reel arms of the improved device against the resistance of the spring 18 which is thus wound up by the operation of removing the line from the reel arms, the pawl 20 holding the spring in its wound condition. When the winding upon the line reel is completed, the drying reel device will be rewound readily for the next operation and held in that position by the holding pawl.

The improved device is simple in construction, can be inexpensively manufactured and applied, and when not in use may be folded into small space and hooked upon a wall or otherwise disposed of. The improved device may be carried by fishermen with their other tackle and enables them to thoroughly dry out their lines after each day's fishing and thus preserve them from decay.

Having thus described the invention, what is claimed as new is:

1. In a device of the class described, an operating member, means for rotating said operating member, an inner bearing plate carried by said operating member and partaking of its motion, a plurality of pins rigidly connected to said inner bearing plate and extending therefrom, an outer bearing plate slidable on said operating member and rotative therewith and having sockets to receive the outer ends of said pins, reel arms supported by said pins, and means for holding said outer bearing plate upon said operating member and pins and against said arms.

2. In a device of the class described, an operating member, means for rotating said operating member, an inner bearing plate carried by said operating member and partaking of its motion, a plurality of pins arranged in pairs and rigidly connected to said inner bearing plate and extending therefrom, an outer bearing plate slidable on said operating member and rotative therewith and having sockets to receive the outer ends of said pins, a reel arm engaging one pair of said pins intermediate its ends, a reel arm mounted to swing upon each of the other pins, and means for holding said outer bearing plate upon said operating member and pins and against said arms.

In testimony whereof I affix my signature in presence of two witnesses.

THEODORE LINSTER. [L. S.]

Witnesses:
WM. A. CHAPMAN,
ETHEL STOCKWELL.